Patented Oct. 23, 1934

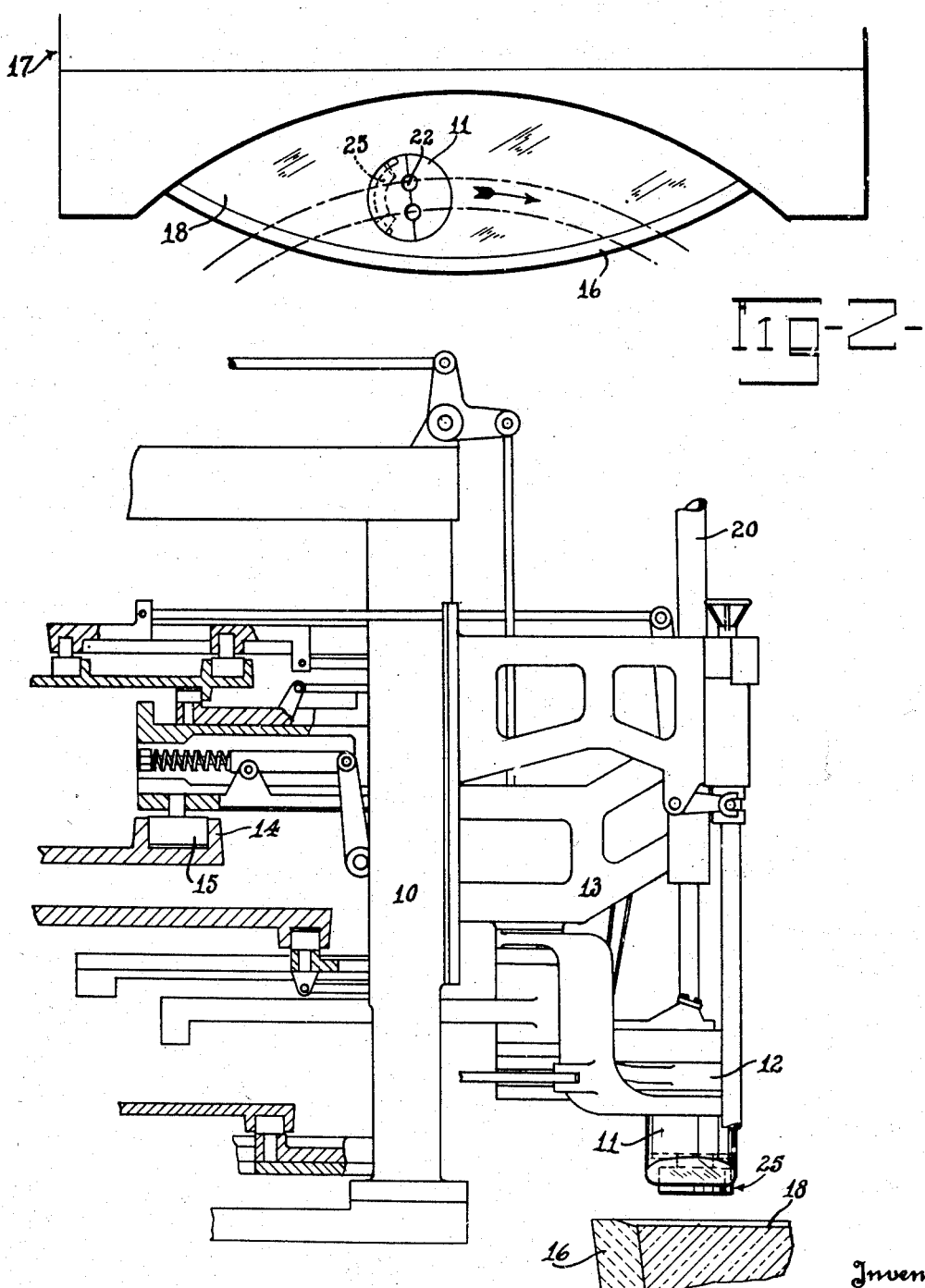

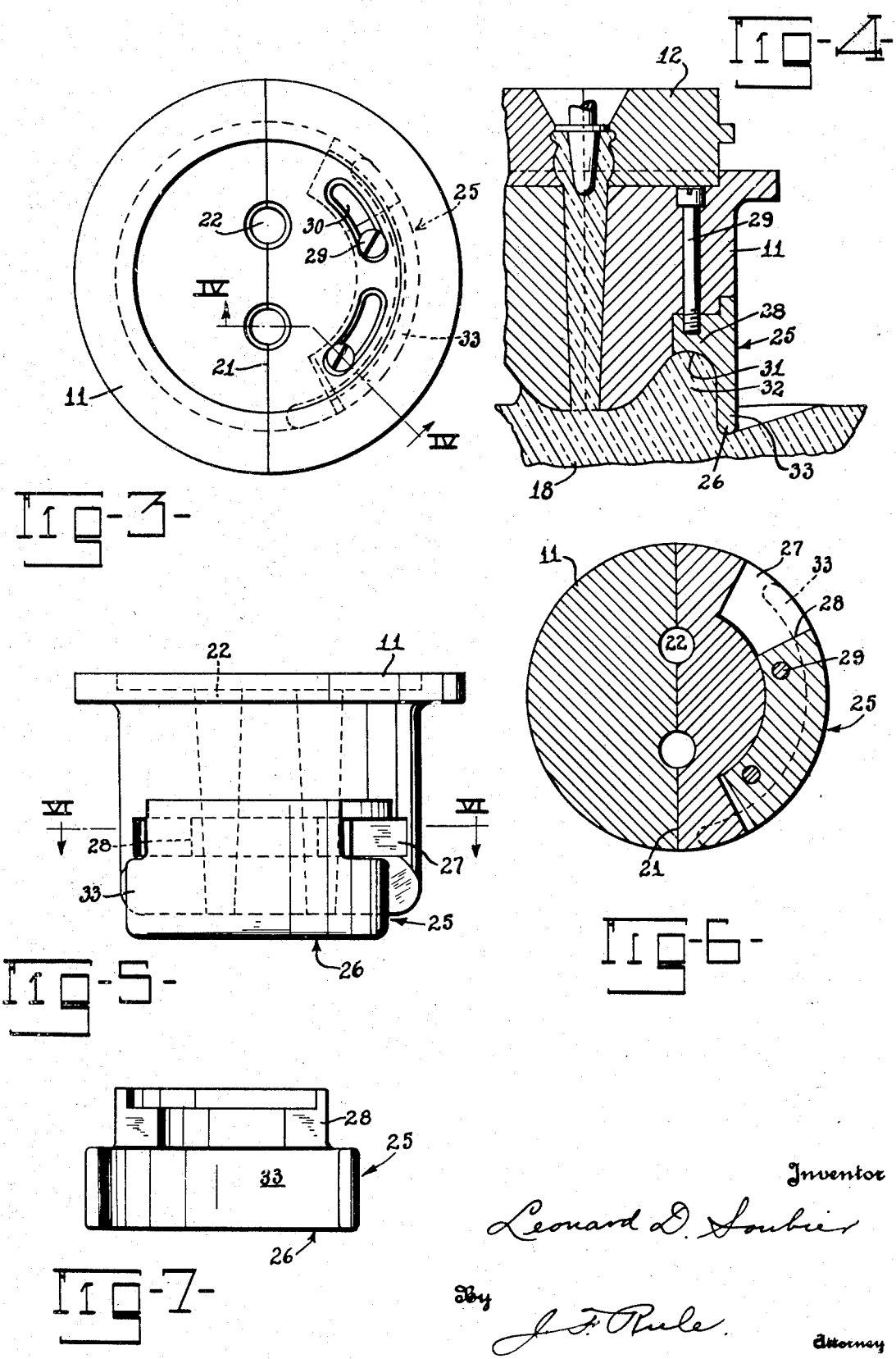

1,978,032

UNITED STATES PATENT OFFICE 1,978,032

APPARATUS FOR GATHERING MOLTEN GLASS

Leonard D. Soubier, Toledo, Ohio, assignor to Owens-Illinois Glass Company, a corporation of Ohio Application May 25, 1933, Serial No. 672,816

6 Claims. (Cl. 49—5)

My invention relates to machines for molding glass articles, of the type in which the molds are caused to travel over a pool or supply body of molten glass and gather their charges of glass by suction. More particularly, the invention relates to a mold plow or device arranged to project downward into the glass behind the traveling mold for the purpose of lifting or holding a supply of molten glass in sealing contact with the mold cavity while a charge of glass is being drawn by suction into the mold. The mold plow also serves as a glass circulating device.

The present invention embodies certain improvements on the apparatus disclosed in the patent to Rule and Soubier, Number 1,801,457, April 21, 1931.

In machines of the type above indicated, the molds may gather their charges from a stationary pot or container which may be a forehearth extension of the main tank, or the glass may be gathered from a rotating pot. The temperature of the glass is not always uniform throughout the gathering area, but usually varies at different distances from the rim of the pot. It is highly desirable that the temperature of the glass should be uniform throughout the area from which the glass is drawn into the molds.

An object of the present invention is to provide a mold plow which is adjustable in a manner to adjustably vary and control the path of movement of the glass from the pot into the mold, and in a way to insure glass of uniform temperature entering the mold. The invention is of special value in connection with plural cavity molds. Such molds are ordinarily arranged with the mold cavities traveling in separate paths at different radial distances from their center of rotation and thus gathering their charges of glass at different distances from the rim of the pot. The present invention provides means for adjusting the plow in a manner to counteract these inequalities in temperature and thereby obtain mold charges which are of equal temperature in all of the mold cavities. Such equality of temperature is essential to the production of ware of uniform quality. The several operations of gathering a charge of glass, severing it from the supply body, compacting it in the mold, cooling it, reheating, expanding it in the finishing mold, and finally discharging it, must all be timed to correspond with the temperature of the glass in order to produce perfect ware. Evidently if the glass gathered in one mold cavity of a plural cavity mold is at a different temperature from that gathered in the other mold cavity, it is impossible to obtain uniform results in the finished ware. If the operations are timed to obtain the best results with the charge entering one mold cavity, the other charge will result in an inferior or defective product. An aim of the present invention is to overcome this difficulty.

A further object of the invention is to provide a plow adjustable in such manner and into such position relative to the mold that it will effectively hold a supply of glass in sealing contact with the mold while the charge of glass is entering the mold cavity and thereby prevent leakage of air into the mold.

Other objects of the invention will appear hereinafter.

In my copending application Serial Number 566,645, filed October 3, 1931, on which Patent No. 1,967,377 was granted July 24, 1934, there is disclosed subject-matter also disclosed in the present application. The latter is a continuation of said copending application, as to all such subject-matter common to the two applications.

Referring to the accompanying drawings:

Fig. 1 is a sectional elevation of one head or unit of a suction gathering machine, to which the present invention is applied.

Fig. 2 is a diagrammatic plan view of a gathering pot and a traveling mold in glass gathering position.

Fig. 3 is a plan view of a mold with a plow attached thereto.

Fig. 4 is a fragmentary sectional elevation at the line IV—IV on Fig. 3.

Fig. 5 is an elevation of the mold and plow.

Fig. 6 is a section at the line VI—VI on Fig. 5.

Fig. 7 is an elevation of the plow, looking at the inner side thereof.

Referring particularly to Fig. 1, I have shown the invention applied to an Owens suction type machine such as disclosed in the patent to LaFrance, Number 1,185,687, June 6, 1916. The machine comprises a mold carriage 10 which rotates continuously about a vertical axis and carries an annular series of heads or units. Each unit comprises a parison mold including a body blank mold 11 and a neck mold 12, said molds carried on a dip frame 13 which is movable vertically on the mold carriage for lowering and lifting the molds. Such movement of the dip frame is controlled by a stationary cam 14 on which runs a roll 15 having the usual operating connections with the dip frame.

As the mold carriage rotates, each mold 11 is brought over a pot or container 16, herein shown as a forehearth extension of a glass melting and refining tank 17. When a mold reaches a position over the tank 16, it is lowered into sealing contact with the supply body 18 of molten glass and the mold cavities filled by suction applied through a pipe 20 under the control of the usual valves (not shown). Each mold 11 may comprise separable sections having vertical meeting faces 21 and formed with a plurality of mold cavities 22.

In accordance with the present invention, each blank mold is provided with an implement or plow 25 which is attached to the mold in position to extend downward behind the mold and dip into the glass when the mold is lowered to its charging position. The lower margin 26 of the plow is preferably at a level below the bottom of the mold. The plow serves to lift or scoop the glass up and hold it in sealing contact with the lower end of the mold cavity in a manner to insure a perfect seal and prevent air leakage into the mold cavity. The plow also serves to carry or push forward along with the mold, that portion of glass from which the mold charge is being drawn. This prevents the usual drag or pull of the glass in the tank on the glass entering the mold, due to the forward movement of the mold relative to the supply body of glass, and thereby greatly facilitates the movement of the glass into the mold.

The mold section to which the plow is attached is cut away to provide an arc-shaped recess 27 to receive the plow. The latter comprises an arc-shaped body portion 28 which fits within the recess 27 but is of less length than said recess to permit adjustment of the plow in a direction circumferentially of the mold. The plow is held in its adjusted position by means of screw bolts 29 which extend downward through slots 30 formed in the mold, the lower ends of the bolts having a screw threaded connection with the plow. The lower inner face 31 of the plow body 28 is flush with the lower face of the mold and extends rearwardly and downwardly therefrom in a curve, providing a pocket 32 for the glass in front of the plow. The lower portion or blade 33 of the plow is in the form of an arc-shaped wall behind the mold, said wall, as shown, extending in an arc circumferentially of the mold. The length of the plow is such that it traverses a path of greater width than the distance between the mold cavities 22, so that the body of glass which is carried forward by the plow extends laterally beyond the mold cavities.

By adjusting the plow circumferentially of the mold, it may be positioned to gather glass at different distances from the rim of the pot, depending upon its position of adjustment. Such adjustment also permits the plow to be accurately positioned for holding the glass in sealing contact with the mold cavities as the mold and plow advance. Adjustment for this purpose has been found to be important because the position of adjustment for obtaining satisfactory results depends upon the condition and temperature of the glass and the rate at which the mold is advancing relative to the glass during the charging operation.

Modifications may be resorted to within the spirit and scope of my invention.

What I claim is:

1. The combination of a suction gathering mold having a mold cavity opening through the bottom thereof, means for causing the mold to travel horizontally over a pool of molten glass, a plow positioned behind the mold cavity and mounted to travel with the mold, said plow dipping into the glass during the travel of the mold thereover, and means for adjusting the plow laterally of its direction of travel and thereby adjustably shifting its path of travel through the glass.

2. The combination of a suction gathering mold having a mold cavity opening through the bottom thereof, means for causing the mold to travel horizontally over a pool of molten glass, a plow positioned behind the mold cavity and mounted to travel with the mold, said plow dipping into the glass during the travel of the mold thereover, and means for adjusting the plow circumferentially of the mold.

3. The combination of a mold having a vertically disposed mold cavity opening through the bottom of the mold, said mold having an arc-shaped recess in one side thereof, a plow comprising a body seated in said recess and horizontally adjustable therein, and means for securing the plow in adjusted position.

4. The combination of a mold having a vertically disposed mold cavity opening through the bottom of the mold, said mold having an arc-shaped recess in one side thereof, a plow comprising a body seated in said recess and horizontally adjustable therein, and means for securing the plow in adjusted position, said plow comprising an arc-shaped blade concentric with the mold and projecting downward below the bottom face of the mold.

5. The combination of a mold comprising horizontally separable sections having their meeting faces in a vertical plane, the mold having recesses in said faces forming a plurality of mold cavities opening through the lower end of the mold, one of said mold sections having an arc-shaped recess in its outer face, a plow comprising a body portion seated in said last mentioned recess and adjustable therein circumferentially of the mold, and means for securing the plow in its adjusted position, said plow including an arc-shaped blade extending downward below the mold.

6. The combination of a mold comprising horizontally separable sections having their meeting faces in a vertical plane, the mold having recesses in said faces forming a plurality of mold cavities opening through the lower end of the mold, one of said mold sections having an arc-shaped recess in its outer face, a plow comprising a body portion seated in said last mentioned recess and adjustable therein circumferentially of the mold, means for securing the plow in its adjusted position, said plow including an arc-shaped blade extending downward below the mold, and means for causing the mold to travel horizontally over a pool of molten glass in a direction transverse to said meeting faces and with the plow blade dipping into the glass during said travel, said blade being of a length to span the path of the mold cavities and positioned to hold a supply of glass in sealing contact with the mold cavities and thereby prevent air leakage when suction is applied to the mold cavities.

LEONARD D. SOUBIER.